(12) United States Patent
Matsumoto et al.

(10) Patent No.: US 7,288,222 B2
(45) Date of Patent: Oct. 30, 2007

(54) METHOD OF PRODUCING A CARBIDE SINTERED COMPACT

(75) Inventors: Akio Matsumoto, Fukuoka (JP); Akira Kawakami, Fukuoka (JP); Tatsuya Goto, Fukuoka (JP)

(73) Assignee: Toto Ltd., Fukuoka (JP)

( * ) Notice: Subject to any disclaimer, the term of this patent is extended or adjusted under 35 U.S.C. 154(b) by 527 days.

(21) Appl. No.: 10/069,702

(22) PCT Filed: Mar. 30, 2001

(86) PCT No.: PCT/JP01/02783

§ 371 (c)(1),
(2), (4) Date: Jun. 4, 2002

(87) PCT Pub. No.: WO01/72659

PCT Pub. Date: Oct. 4, 2001

(65) Prior Publication Data

US 2003/0013794 A1  Jan. 16, 2003

(30) Foreign Application Priority Data

Mar. 31, 2000 (JP) ............................. 2000-099855
Nov. 24, 2000 (JP) ............................. 2000-357467
Nov. 29, 2000 (JP) ............................. 2000-362568
Dec. 4, 2000 (JP) ............................. 2000-368248

(51) Int. Cl.
*C04B 35/64* (2006.01)
*B28B 1/26* (2006.01)
*B28B 3/20* (2006.01)
(52) U.S. Cl. .................... 264/126; 264/86; 264/651
(58) Field of Classification Search ................ 264/604, 264/651, 86, 109, 123, 125, 126, 128; 428/403–405, 428/407; 501/87–88, 97
See application file for complete search history.

(56) References Cited

U.S. PATENT DOCUMENTS

| 4,004,934 A | * | 1/1977 | Prochazka | ............... 501/90 |
| 4,081,284 A | | 3/1978 | Prochazka et al. | |
| 4,195,066 A | | 3/1980 | Schwetz et al. | |
| 4,233,256 A | * | 11/1980 | Ohnsorg | ............... 264/645 |

(Continued)

FOREIGN PATENT DOCUMENTS

EP          0729073 A1    8/1996

(Continued)

OTHER PUBLICATIONS

Jang et al, Densification of Alumina-silicon Carbide Powder Composites: I Effects of a Polymer Coating on Silicon Carbide Particles, Journal of American Ceramic Society, vol. 72, Jun. 1989, pp. 948-953.*

*Primary Examiner*—Carlos Lopez
(74) *Attorney, Agent, or Firm*—Carrier, Blackman & Associates, P.C.; Joseph P. Carrier; William D. Blackman

(57) ABSTRACT

A wet-type compacting method of a ceramic powder using a solvent, wherein the ceramic powder is coated with a high polymer organic substance which is substantially insoluble in the solvent so that homogeneity of a compact is kept, while generating no problem during each process and excellent plasticity and/or strength are exhibited by the compact, and if a sintering process follows a compacting process, sintering characteristics are improved.

10 Claims, 3 Drawing Sheets

U.S. PATENT DOCUMENTS

| | | | |
|---|---|---|---|
| 4,252,691 A | | 2/1981 | Lipp et al. |
| 4,524,138 A | | 6/1985 | Schwetz et al. |
| 4,739,690 A | | 4/1988 | Moskowitz |
| 5,145,812 A | * | 9/1992 | Arai et al. .................. 501/96.2 |
| 5,505,899 A | | 4/1996 | Sigl et al. |
| 5,530,081 A | * | 6/1996 | Nover ..................... 156/89.11 |
| 5,720,910 A | | 2/1998 | Vlajic et al. |
| 5,720,911 A | | 2/1998 | Taylor et al. |
| 5,996,113 A | | 11/1999 | Korn et al. |
| 6,008,281 A | * | 12/1999 | Yang et al. .................. 524/322 |

FOREIGN PATENT DOCUMENTS

| | | |
|---|---|---|
| GB | 2014193 | 8/1979 |
| JP | 1192764 | 8/1989 |
| JP | 04-347008 | 12/1992 |
| JP | 05-174520 | 7/1993 |
| JP | 06-100372 | 4/1994 |
| JP | 06-144915 | 5/1994 |
| JP | 06-297421 | 10/1994 |
| JP | 07-097264 | 4/1995 |
| JP | 07-267741 | 10/1995 |
| JP | 8192497 | 7/1996 |
| JP | 8207205 | 8/1996 |
| JP | 10-001366 | 1/1998 |
| JP | 10149976 | 6/1998 |
| JP | 11322405 | 11/1999 |
| JP | 2000-182945 | 6/2000 |
| JP | 2000-264696 | 9/2000 |
| WO | WO98/51988 | 11/1998 |
| WO | WO 00-68165 | 11/2000 |
| WO | WO 01/72659 A1 | 10/2001 |

* cited by examiner

2−φ 5 0 Hole

METHOD OF PRODUCING A CARBIDE SINTERED COMPACT

BACKGROUND OF THE INVENTION

1. Field of the Invention

The present invention relates to a wet-type compacting method for powder, a production method for a sintered powder compact obtained by sintering a compact obtained by the wet-type compacting method of powder, a sintered compact obtained by the production method, and an application device thereof.

2. Description of the Prior Art

When producing a product by compacting and sintering a powder such as ceramics or powder metallurgical materials, it is known that production of a large and complicated shaped product is extremely difficult.

First of all, it is difficult to compact the powder. Since strength of a large and complicated shaped powder compact is low, the compact is brittle and easily damaged, and its handling is difficult. And a large and complicated shaped powder compact cannot be obtained by only pressing the powder. In this case a technique of wet-type compacting is usually adopted whereby a mixture of the powder and a solvent is produced anywhere in a compacting process and a compact or the precursor thereof is formed from the mixture. The compact or the precursor thereof made from the mixture of the powder and the solvent is often applied with external force during processing. To avoid unexpected damage, the mixture of the powder and the solvent is required to provide plasticity. However, an ordinary mixture of the solvent and the powder is seldom provided with plasticity unless it contains a large amount of plastic powder such as clay.

To relieve such difficulty in the compacting process, a compacting aid may be added to the mixture of powder and solvent. Such a compacting aid includes, for example, a binder for imparting strength to the dried compact, or a plasticizer for imparting plasticity to the mixture of powder and solvent.

High polymer organic substance is mainly used as a compacting aid such as the binder or plasticizer, but it is desirable that these compacting aids are uniformly dispersed in the mixture of powder and solvent. To create a condition where the high polymer organic substance is uniformly dispersed in the mixture of powder and solvent, according to a conventional technique, a high polymer organic substance which is soluble in the solvent or is dispersible in a form such as an emulsion is used, and such a technique is disclosed, for example, in Japanese Unexamined Patent Publication No. HEI 7-267741, Japanese Unexamined Patent Publication No. HEI 10-1366 or the like.

To coat the surface of the powder with an organic high polymer in advance to compact the powder, a technique is known whereby, when silicon nitride powder of which the water resistance is low is compacted with a solvent of a water system, the powder is coated with a resin which is insoluble in water to impart water resistance to the powder. This technique is disclosed in Japanese Unexamined Patent Publication No. HEI 6-100372. However, this does not impart plasticity and strength to the compact, therefore it is necessary to separately add a compacting aid such as a water-soluble plasticizer or a binder. Japanese Unexamined Patent Publication No. 2000-264696 also discloses a technique whereby the surface of a powder is coated with resin and then compacted using an organic solvent. However, this resin is soluble in the organic solvent. Plasticity is thus imparted by making use of solubility.

The compacting process was described above in detail, but another reason for difficulty in producing a large and complicated shaped product is that uniform and dense sintering is so difficult.

To sinter a powder compact uniformly and densely, it is necessary to uniformly and compactly pack the powder for the compact. In addition, a method of adding a sintering aid for promoting sintering to a mixture of powder and solvent or sintering by hot pressing under conditions of high temperature and high pressure can be applied. It is also known that the more minute the ceramic powder, the easier the sintering. However, it is to be noted that the more minute the powder, the more difficult the compacting.

Description was made above as to how difficult is the production of a large and complicated shaped product in the compacting and sintering process, and carbide ceramics such as silicon carbide or boron carbide are considered to be difficult materials to compact and sinter. Among these, boron carbide ceramics are considered to be more difficult in processing. Boron carbide sintered compact is usually produced by hot pressing because of its difficulty in sintering. Japanese Unexamined Patent Publication No. HEI 7-97264 discloses a production method by atmospheric pressure sintering. However, it is impossible to produce products of a large and complicated shape in this method and the maximum relative density of sintered compact is about 96%.

Slip casting is most suitable for producing large and complicated shaped products among various compacting techniques, but it is the most technically difficult compacting method. Slip casting techniques for silicon carbide among the carbide ceramics that are difficult to compact are disclosed in Japanese Unexamined Patent Publication No. HEI 6-144915 and the like. However, for boron carbide that is more difficult to compact, a slip casting technique is not yet known.

An application field for a sintered powder compact, in particular, a ceramic sintered powder compact includes a movable section for a mobile body device having a highly accurate positioning function. The mobile body device which requires the highly accurate positioning function includes a three-coordinate measuring machine, a straightness measuring device, and a lithography machine for forming patterns on a plain object or the like. In the mobile body device provided with such a highly accurate positioning function, a small type of device provided with such a bearing as disclosed in Japanese Unexamined Patent Publication No. HEI 5-174520 is known. As a large type of device, a hydrostatic fluid bearing device is mainly used. In particular, in the lithography machine, when a modern semiconductor wafer or a liquid crystal panel is produced, a highly accurate positioning function corresponding to the finer microstructure of the patterns is required. At the same time, to form the patterns economically, it is necessary that the mobile body loaded with a workpiece such as a semiconductor wafer or a liquid crystal panel to be exposed and a reticle or the like, is moved at high speed to improve the throughput of the device. However, to move the mobile body at high speed inevitably generates vibration that is a minus factor with reference to positioning accuracy. Further, to move the mobile body at high speed under a fixed driving force, it is necessary to lighten the movable section.

To cope with both the high speed and the high positioning accuracy, it is necessary to use a mobile body constructed from a material with a large specific rigidity ratio (Young's modulus/Specific gravity). Accordingly, in place of a conventional material of a metal system, the mobile body device adopting the movable section using a construction material made of ceramics has become available in recent years. For example, Japanese Unexamined Patent Publication No. HEI 4-347008 discloses that a fluid bearing made of ceramics is superior to a metal bearing in specific rigidity. A fluid bearing made of alumina is disclosed in Japanese Unexamined Patent Publication No. HEI 6-297421 as an embodiment thereof. Japanese Unexamined Patent Publication No. HEI 6-297421 also discloses examples of ceramic materials used in the fluid bearing, wherein silicon nitride and silicon carbide are mentioned, which will provide a ceramic sintered compact with a larger specific rigidity ratio than Alumina if they are completely densely sintered. Japanese Unexamined Patent Publication No. 2000-182945 also discloses members for a lithography device in which silicon carbide and boron carbide having a large specific rigidity ratio are used.

An application field for the sintered powder compact, in particular, ceramic sintered powder compact includes a protective member for efficiently absorbing shock from collision with a missile.

Development of a protective member for a human body, structure, mobile body or the like to absorb shock from collision with a missile has been an important theme since the beginning of the history of man, and continuous progress has been made from ancient shields and armatures for protecting from arrows and javelins to present protective structures for a spacecraft in collision with meteorites. Metal has consistently played a leading part in such development, in particular, alloys of iron. Even if the heat resistance of iron has come under question since entering the space age, metal is still regarded as important material thanks to the development of heat-resistant special steels and the like.

Superiority of metal as the protective member can be found in two points: impact strength and workability. One more characteristic essential for the protective member is extra hardness. Recommended as an industrial material for extra hardness is a ceramic sintered powder compact. However, ceramic material is generally regarded as solid, but brittle and easily cracked. It is true that the ceramic material is inferior to metal in impact strength and there has been no trials for using ceramic material as the protective member for absorbing the shock of collision with a missile up to recent years.

However, a protective member using a ceramic material called Chobam composite armor has been recently developed. Ceramics cannot overcome their own brittleness alone, but a new structure which can absorb shock was attained by combining a ceramic plate with an extremely tough steel plate or by partly adopting a hollow structure therein. The background of appearance of such a structure is in that the main object to be protected against has changed from a missile such as AP, APC, APDS, and APFSDS mainly utilizing kinetic energy whereby the impact is limited by the rate of fire to a missile such as HEAT mainly utilizing chemical energy by jetting in the vicinity of the protective member, and it has become necessary to protect from shock caused by collision with the missile of which the speed has become extraordinarily high compared with a conventional one. This necessity increases more when the protective member is used in a spacecraft or the like which needs protection from a missile which flies faster.

Since protective members using ceramics were put to practical use, attention has been paid to its lightness compared with metal, and, in particular, development has advanced mainly for use in the aerospace industry. In a protective member aiming at lightening, a structure of ceramic tile provided with a backup layer of fiber reinforced plastic is common. The structural examples are disclosed, for example, in U.S. Pat. Nos. 4,739,690, 5,996,113, WO 98/51988 and the like.

However, there have been the following problems in the prior art.

When a compacting aid of organic high polymer is used in the wet-type powder compacting process and, for example, slip casting is adopted as a compacting method, the compacting aid soluble in a solvent often causes clogging in a mold. And the compacting aid soluble in the solvent sometimes causes its segregation in a compact in the process of drying the solvent from the compact and as a result, the compact after drying becomes heterogeneous. The heterogeneous compact remains heterogeneous even in the next sintering process and, as a result, a heterogeneous sintered compact is only available. And in compacting a non-plastic body, even if the compacting aid imparting plasticity is added according to a conventional method, the plasticity is still inferior compared with plastic body such as a clay base body. Accordingly, there is a limit to the size and shape of the compact.

Since these compacting aids must be burnt off in the next sintering process, the density of a sintered body decreases and as a result, satisfactory physical properties of the sintered body cannot be obtained. It is also difficult to uniformly disperse an ordinary sintering aid in a mixture of powder and solvent. As a result, the sintering aid heterogeneously existing in the compact results in heterogeneous physical properties of the sintered compact. Further, according to a method of promoting sintering by hot pressing under high temperature and high pressure, increase of manufacturing cost is inevitable. Basically, it is not possible to manufacture a large and complicated shaped product from the limits of the equipment by hot pressing.

Accordingly, with reference to carbide ceramics which are difficult to compact and sinter, and in particular, to boron carbide, it has been regarded as completely impossible to manufacture a large and complicated shaped product at low cost until now.

Further, when a sintered powder compact, in particular, a ceramic sintered powder compact is applied to a movable section of a mobile body device having a highly accurate positioning function, if, for example, alumina is used, the specific rigidity ratio of alumina is about 80~95 GPa even if the alumina is sintered until its Young's modulus reaches close to the maximum value. The specific rigidity ratio in such a case is not enough to attain the superb throughput and positioning accuracy which are required, for example, in a lithography machine.

Ceramics such as silicon nitride, silicon carbide or boron carbide are materials difficult to sinter and compact compared with alumina and it is difficult to economically compact and sinter a large product which can be used in the movable section of the lithography machine. In particular, in the conventional manufacturing method, hot pressing is required to manufacture a large product, not a small test piece, which can be put to practical use. However, as far as hot pressing is used, the manufacturing cost is enormous and the complicated shaped product cannot be produced.

Further, to improve the specific rigidity ratio of the movable section in the lithography machine, not only material of high specific rigidity ratio but also a rib structure or hollow structure should be adopted to improve the apparent specific rigidity ratio. However, when ceramic material of high specific rigidity ratio is used, adoption of such a structure results in more difficulty in compacting and sintering. Accordingly, it has been considered that adoption of the rib structure or hollow structure was impossible until today.

Still further, when a sintered powder compact, in particular, a ceramic sintered powder compact is applied to a protective member for efficiently absorbing the shock from collision with a missile (a flying object), in other words, when the ceramic material is used as a component of the protective member for absorbing the shock from collision with the missile, it is not possible to produce a large and complicated shaped product. In this case, a plate or tile shaped ceramic members can only be used in combination. Accordingly, when such ceramic members are applied to the protective member of the complicated shaped device, there is a limit to combination of the plate-shaped ceramic members and the joint section causes a problem. For example, U.S. Pat. Nos. 4,739,690, 5,996,113, WO 98/51988 and the like disclose such a joint structure, wherein techniques whereby a joint section is thickened to provide build-up, a butt joint structure is provided, or an adhesive agent is used, are disclosed. However, in such a structure, fragility of the joint section cannot be sufficiently covered.

It is also difficult for the protective member of a tabular structure to be arranged obliquely to the predicted direction of collision with the missile. A conventional protective member of metal material has a curved structure in many cases, but a ceramic composite protective member can only have a square structure which has a drawback of inferior defending ability.

And it is considered that a ceramics composite armor of a sandwich structure should adopt a rib structure or hollow structure to disperse the shock, but a combination of plate-shaped ceramics cannot have such a structure.

SUMMARY OF THE INVENTION

It is therefore an object of the present invention to solve the above-mentioned problems and to provide a wet-type compacting method of powder using a solvent, wherein homogeneity of a compact is kept while generating no problem during each process, excellent plasticity and/or strength are applied to the compact, and if a sintering process follows a compacting process sintering characteristics are improved.

It is a second object of the present invention to provide a mobile body device having a positioning function, such as a hydrostatic fluid bearing for a lithography machine, wherein high speed and highly accurate positioning is attained by forming a movable section of the mobile body device from a construction material of high rigidity and light weight.

It is a third object of the present invention to provide a protective member for absorbing shock from collision with a missile of light weight and low cost, wherein highly efficient shock absorption can be attained.

According to the present invention, to solve the above problems, a wet-type compacting method for powder is provided, characterized in that a compact is produced from a mixture of a solvent and carbide powder coated with a high polymer organic substance which is substantially insoluble in the solvent. A compact obtained by this compacting method is also provided. A production method for a sintered powder compact is provided, in which the compact obtained by the wet-type compacting method for powder is dried and then sintered. A production method for a sintered powder compact is provided, wherein a mixture including a ceramic powder, a solvent, and an aid as its main components is set as a starting material, and in compacting and sintering processes, the aid functions as a compacting aid for imparting plasticity and/or strength to a compact or its precursor in the compacting process, while the aid also exhibits an effect as a sintering aid for promoting sintering in the sintering process. A sintered powder compact obtained by this production method for a sintered powder compact is also provided. A production method for boron carbide sintered compact is provided, which comprises the steps of pouring slurry of a powder of which the main component is boron carbide of an average particle size of 0.3 µm~1.4 µm, a compacting aid and a sintering aid dispersed together in a solvent into a porous mold, letting the porous mold absorb a part of the solvent to solidify the slurry, thereby forming a compact, and after drying the compact, atmospheric pressure sintering under a non-oxidizing atmosphere or HIP-treating after the atmospheric pressure sintering under a non-oxidizing atmosphere. A boron carbide sintered compact produced by the production method above is provided. A mobile body device having a positioning function is provided, in which the sintered compact is used in a part or all of a movable section of the mobile body device. A hydrostatic fluid bearing device is provided, in which a part or all of the movable section is made of material of a specific rigidity ratio of 100 GPa or more, and a part or all of the movable section has a hollow structure and/or rib structure. A protective member for absorbing shock from collision with a missile including the sintered compact as its component is provided. A device having a protective member arranged obliquely to the estimated direction of collision of the missile in all or a part of its crust is provided, wherein the protective member has a curved structure for absorbing shock from collision with a missile and includes a ceramic sintered compact which has a curved structure as its component. A protective member having a curved section used in the device is provided.

BRIEF DESCRIPTION OF THE DRAWINGS

The above and other objects, features and advantages of the present invention will become more apparent from the following description when taken in conjunction with the accompanying drawings.

In FIG. 1, the thickness of each section is 10 mm, but this may differ at a corner section;

In FIG. 3, the thickness of a double section at both ends is 15 mm, and the thickness of a single section at the center is 10 mm.

DETAILED DESCRIPTION OF THE PREFERRED EMBODIMENTS

Figure 1:
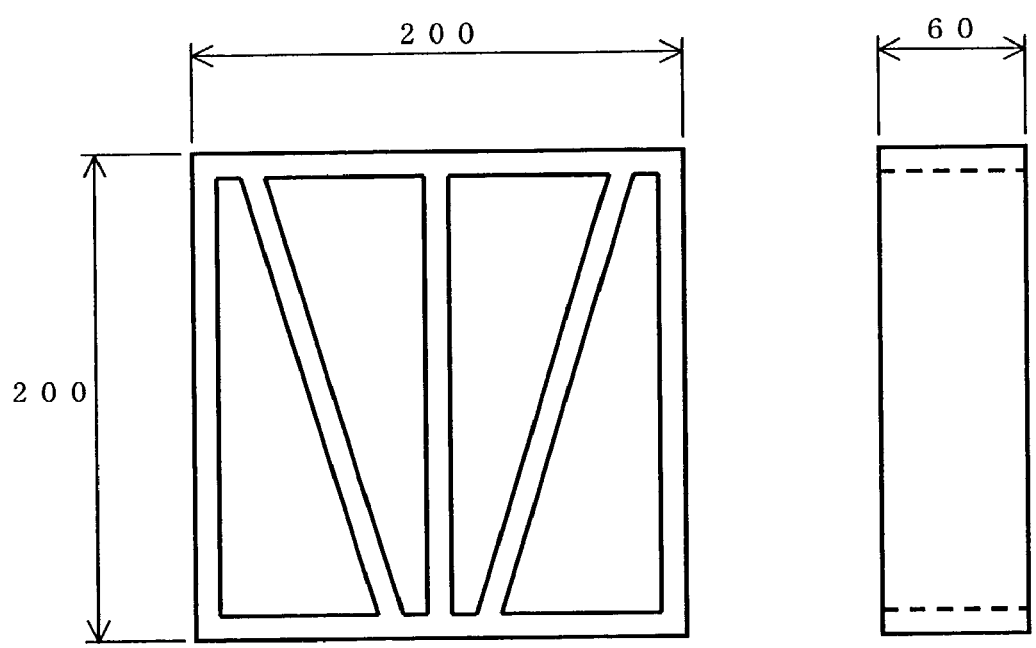
FIG. 1 is an explanatory view of a rib-structured, solid casting compact.

Preferred embodiments of the present invention will now be described with reference to the accompanying drawings.

First, components of the present invention will be explained. There is no specific limitation in a compacting process for powder to which the present invention can be applied. However, the present invention can be suitably applied to a compacting process accompanied by sintering process thereafter, and in particular, the present invention is most suitably applied to a compacting process for a ceramic powder and a sintering process thereafter.

As a solvent in the present invention, both a water system and an organic solvent system are applicable, but if plasticity and ease and safety of the compacting process are taken into consideration, water is easier to handle.

In the present invention, a high polymer organic substance coated on a powder exhibits a function as a compacting aid or a sintering aid. It is desirable that the high polymer organic substance used to function as such a compacting aid or a sintering aid uniformly exists around the powder in the compacting process or the sintering process. According to a conventional method, the powder is compacted in the condition in which the high polymer organic substance is dissolved in a solvent. The amount of solvent decreases with the advance of the compacting process and it completely disappears at the end. The dissolved high polymer organic substance is caused to exist between gaps in the powder.

However as described above, this method causes defects, for example, that in slip casting process the casting mold absorbs the high polymer organic substance and the mold is clogged, and that in drying process of the compact partial segregation of the high polymer organic substance in the compact is generated. Thus, it is not possible to provide the compact or the sintered compact thereof with satisfactory physical properties.

Accordingly, in the present invention, as a means for providing the high polymer organic substance uniformly around a powder during a compacting process or during a sintering process (if adopting after the compacting process), a powder coated with the high polymer organic substance which is substantially insoluble in the solvent to be used is prepared in advance. And a method of compacting the powder thus coated with the high polymer organic substance is the most desirable embodiment of the present invention. For example, when slip casting is carried out using water as a solvent, a high polymer organic substance that is soluble in organic solvents, but is substantially insoluble in water is first dissolved in an organic solvent. After the solution and a ceramic powder are mixed, the organic solvent is removed from the mixture by a means such as evaporation. In this manner, the powder coated with the high polymer organic substance is produced. Then, the powder coated with the high polymer organic substance is mixed with water to produce a slurry. Slip casting is performed using the slurry. When slip casting is performed using an organic solvent, the surface of the ceramic powder is coated in advance with the high polymer organic substance that is soluble in water, but substantially insoluble in organic solvents. In addition, it is also possible to coat the powder surface with the high polymer organic substance by means of a spray drying method or a method of directly spraying or mixing the high polymer organic substance. This is completely opposed to the concept that "a compacting aid soluble in the used solvent is required" which is common sense for a conventional wet-type compacting method. Water-solubility or oil-solubility to each solvent in this case can be applied including formation of a water-based or oil-based emulsion. The meaning of "insoluble in water or organic solvent" is not "never soluble", as even if a very small amount of the high polymer organic substance is soluble, this can be disregarded for all practical purposes. For example, when a phenol resin is used as the high polymer organic substance, most novolac type phenol resin is oil-soluble and most resorcinol type phenol resin is water-soluble. When slip casting is performed using water as a solvent, it is suitable to use the oil-soluble novolac type, and when slip casting is performed using an organic solvent as a solvent, it is suitable to use the water-soluble resorcinol type.

The high polymer organic substance according to the present invention includes epoxy resin, polyurethane resin, diallyl phthalate resin, polyethylene resin, polycarbonate resin, fluorocarbon resin, polypropylene resin, urea resin, melamine resin, polyester resin, styrol resin, acrylic resin, polyacetal resin, polyvinyl acetate resin, phenol resin, polyamide resin, vinyl chloride resin, cellulose resin, saccharides or the like.

A desirable ratio of the powder and the high polymer organic substance coated on the powder in advance is 1–40 parts of the high polymer organic substance to 100 parts of the powder by volume. If the volume of the high polymer organic substance is less than the lower limit of the desirable range, the effect as an aid may not be fully exhibited. On the other hand, if the volume of the high polymer organic substance is more than the upper limit of the desirable range, sintering may not fully progress or, when slip casting is performed, the viscosity of the slurry may become too high for pouring.

The most desirable compacting method in a compacting process according to the present invention is slip casting. Slip casting is a compacting method whereby, taking slip casting of ceramics as an example, a slurry of a ceramic powder as a main component, a compacting aid and a sintering aid dispersed in a solvent, is poured into a porous mold, and the porous mold absorbs a part of the solvent by capillary attraction or direct pressure applied to the slurry to solidify the slurry, thereafter demolding and drying the solidified slurry. Water or various organic solvents are used as the solvent, but a solvent of which the main component is water is widely used. In the present invention, in particular, in case of slip casting a large and thick product, when thickening is performed over a long period of time, a homogeneous compact may not be obtained due to settling of the slurry. In this case, as one means for attaining thickening in a short time, pressure slip casting in which pressure is applied to the slurry during thickening may be adopted. There is no specific limit in pressure, but the higher the pressure, the faster the thickening speed. Industrially, a pressure of about 0.3 MPa~10 MPa is suitable.

In this slip casting process, the solvent from the slurry that is a mixture of powder and solvent is absorbed by the mold to form a compact. When the compact is dried within the mold, released from the mold or processed in a damp or wet condition directly after demolding, plasticity or strength is required to prevent generation of cracks. Further, when the solvent is removed by drying, strength is required to withstand impact or the like during handling. Accordingly, it is possible to suitably apply a wet-type compacting method of the present invention that imparts plasticity and/or strength to the mixture in each process whereby the solvent is removed from the mixture.

The compacting aid used in slip casting serves to improve the flow characteristics of the slurry and the dispersing characteristics of powder in the slurry and functions as a binder or plasticizer of the compact to improve compact strength. Desirable compacting aids other than those exemplified above as the high polymer organic substance include organic substances, for example, alginate such as sodium alginate, ammonium alginate, triethanolamine alginate; polycarboxylic acid ammonium, dibutyl phthalate, carboxylmethylcellulose, carboxymethylcellulose sodium, carboxylmethycellulose ammonium, methylcellulose, methylcellulose sodium, hydroxylethylcellulose, hydroxylethylcellulose sodium, polyvinyl alcohol, polyethylene oxide, sodium polyacrylate, acrylic acid or its ammonium salt oligomer, various amines such as monoethylamine, pyridine, piperidine, tetramethylammonium hydroxide, dextrin, peptone, soluble starch, various polymers, various emulsions, and clays.

To improve the flow characteristics of a slurry means to adjust the viscosity of slurry at an optimum value by a thickening or deflocculating action or to apply thixotropy to the flow characteristics of the slurry. In particular, when the particle size distribution range of a ceramic powder is narrowed taking only sintering characteristics into consideration, the slurry exhibits dilatancy. Accordingly, it is important to make the flow characteristics thixotropic by adding the compacting aid.

As a particle size distribution of the powder desirable to cope with both the sintering characteristics and the flow characteristics, it is desirable for the volume fraction of the powder having a size smaller than ½ of the average size to be 10% or more. If the volume fraction becomes less than the desirable lower limit, the desirable flow characteristics of slurry may not be obtained by addition of the compacting aid. Since there is no upper limit to the volume fraction, when sintering process follows compacting process, it is desirable to widen the particle size distribution within a range where density of the sintered compact does not deteriorate in consideration of the sintering characteristics of each powder.

Slip casting is the most desirable compacting method in the present invention as described above, but other desirable methods for compacting a powder in the present invention include extrusion molding, wet-type press molding, thixotropic molding, tape casting and the like. By using a mixture of powder and the solvent that exhibits plasticity, a method of compacting by utilizing that plasticity is also available. Compacting by utilizing plasticity means a method for compacting by applying force to a compact or a precursor of the compact such as kneaded body in the extrusion molding to utilize plastic deformation of the compact or the precursor of the compact in the compacting process. Extrusion molding is one example of compacting by utilizing plasticity. In these compacting methods, it is possible to suitably apply the present invention because plasticity is utilized in the compacting principle itself and strength of the compact is required during handling after compacting.

As another compacting method for powder, an injection molding method is known whereby a compound which is a mixture of a powder and a resin with plasticity is injected into a die under high shearing stress, high pressure and high temperature. This injection molding method in which a solvent is substantially unused does not belong to the technical scope of the present invention. However, as a simplified means of this injection molding, a molding method for injecting a mixture of a solvent and a powder coated with a high polymer organic substance into a die by applying the present invention does not need such a high shearing stress, high temperature, and high pressure as in the original injection molding because of existence of the solvent. Accordingly, this must be a cogent method with a simplified device.

As a field to which the present invention can be applied, a material that needs a sintering process following a compacting process is desirable and for example, a ceramic sintered compact obtained by compacting and sintering a ceramic powder is included therein. In this case, a method of producing a sintered powder compact characterized in that a mixture including a ceramic powder, a solvent and an aid as its main components is a starting material, wherein in compacting and sintering processes, the aid acts on a compact or the precursor thereof as a compacting aid in the compacting process, while in the sintering process, it also exhibits an effect as a sintering aid for promoting sintering, is also a new concept that the present invention provides. In this manner, the reason for using a common aid for the compacting and sintering aids used in each process with reference to the compacting and sintering methods of the ceramic powder is to ensure that sintering is not prevented. If the compacting aid is not related to sintering, it is necessary to remove the compacting aid during the sintering process by heating. This means that density of the sintered compact is inevitably reduced for a portion in which the compacting aid has been removed. The common aid can prevent such a situation.

A function as the compacting aid of a component such as resin which exhibits both actions as the compacting and sintering aids is, for example, to apply plasticity and/or strength to the compact or the precursor thereof in the compacting process. The plasticity applies flexibility to the compact and functions to prevent cracks due to deformation from being generated even in the case where stress is applied to the compact during processing. Further, strength literally means improving the strength of the compact to prevent damage from crack generation even in the case where an external force such as an impact is applied to the compact. Plasticity is an important factor when a comparatively large amount of solvent is included in the compact. On the other hand, strength becomes more important when the amount of solvent is comparatively less after drying of the compact proceeds. Referring to the use of such an aid exhibiting both effects as the compacting and sintering aids, as compacting methods applicable other than extrusion molding, wet-type press molding, thixotropic molding and tape casting as well as the most desirable slip casting, a compacting method by a technique such as CIP or pressing using granules produced from a mixture of a solvent, the aid, and a powder using a means such as spray drying may be adopted.

As described above, the function as the compacting aid of the component such as resin that shows both effects of the compacting and sintering aid is mainly applying the plasticity and/or the strength. Accordingly, as to the compacting aid exhibiting other functions, it is necessary to separately add, for example, a deflocculating agent or dispersing agent in many cases. It is also possible to use a separate compacting aid for improving the plasticity and strength in combination. With reference to the sintering aid, it is also possible to combine with a separate sintering aid in addition to the component exhibiting both functions of compacting aid and sintering aids.

Preferable components which function not only as the compacting aid but also as the sintering aid include a high polymer organic substance such as above-mentioned coating material for powder, for example, epoxy resin, polyurethane resin, diallyl phthalate resin, polyethylene resin, polycarbonate resin, fluorocarbon resin, polypropylene resin, urea resin, melamine resin, polyester resin, styrol resin, acrylic resin, polyacetal resin, vinyl acetate resin, phenol resin, polyamide resin, vinyl chloride resin, cellulose resin, saccharides or the like. In the case of high polymer organic substances, a carbon content mainly functions as the sintering aid. Accordingly, to improve the efficiency as the sintering aid, an organic substance with a high carbon content such as a phenol resin or a furan resin is desirable.

Materials to which the present invention can be suitably applied include non-plastic inorganic bodies when sintering follows compacting. Among them, a carbide sintered compact is more suitably applicable material. Further, a boron carbide sintered compact known as the most difficult material to compact and to sinter is a ceramic sintered compact to which the present invention can be especially suitably applied.

It is desirable that the boron carbide sintered compact is produced by means of atmospheric pressure sintering, and its porosity is 10 volume % or less. It is more desirable that the porosity is 5 volume % or less. Atmospheric pressure sintering means that extra pressure is not applied and it also includes decompression and vacuum sintering. Further, no extra pressure means that pressure is not applied in the sintering process and it does not matter if any pressure is applied to prevent the compact from being destroyed due to sudden degreasing in a degreasing process. The porosity means the rate including both open pores and closed pores. However, in the present invention, the open porosity is substantially close to zero, so the porosity is substantially the same as the closed porosity. By performing HIP (Hot Isostatic Pressing) treatment on the boron carbide sintered compact after atmospheric pressure sintering, it is possible to further decrease the porosity to improve the rigidity and strength thereof. The desirable porosity after the HIP treatment is 5 volume % or less, preferably 2.5 volume % or less. When the porosity is more than the desirable upper limit, problems whereby the physical properties are unsatisfactory or chipping is easily produced during processing after sintering may occur. Since there is no desirable lower limit in the porosity, the porosity should be decreased to the range wherein desired physical properties are obtained.

In atmospheric pressure sintering of boron carbide, it is desirable that the sintering atmosphere is a non-oxidizing atmosphere such as argon, helium, nitrogen or a vacuum and the maximum temperature is 2000~2400° C. To sinter the boron carbide in this sintering condition, it is desirable that the average particle size of the raw boron carbide powder is 0.3 μm~1.4 μm. A sintering aid is also necessary. Since the powder is very fine compared with ordinary slip casting, it is difficult to improve density of the compact and to provide the plasticity and strength thereof.

To improve such properties of the compact, it is desirable to use the aid that can function as both a compacting aid and a sintering aid. A particularly desirable aid is a resin such as phenol resin and furan resin. The above resin can be used alone as the sintering aid or can be combined with titanium boride, polycarbosilane, tungsten carbide, iron carbide, thallium carbide, titanium carbide, aluminum fluoride, zirconium carbide, carbon black, pitch, tar or the like.

The resin or the like used as the aid is baked in a temperature rising process during a sintering process under a non-oxidizing atmosphere to be reformed to a substance of which the main component is carbon. This substance controls the grain growth of boron carbide and exhibits a function as the sintering aid. This function of the carbon as the sintering aid is peculiar to the atmospheric pressure sintering and make it possible to control the average size of boron carbide crystals in the sintered body at a desirable range of 10 μm or less, preferably of 5 μm or less. If the grain growth advances and the crystal grain size exceeds the desirable range, physical properties such as strength may be badly influenced. The boron carbide before sintering includes many boron rich crystals compared with B4C in many cases, but carbon of the sintering aid is taken into those crystals and as a result, the main component of the boron carbide in the sintered compact becomes B4C. Some part of the carbon as the sintering aid remains in the sintered compact as graphite crystals.

Such phenomenon that an organic high polymer is reformed to a substance which includes the carbon from the organic high polymer as its main component in the non-oxidizing sintering process and that the substance including the carbon as its main component functions also as the sintering aid of the powder can be applied to a field other than the sintering of the boron carbide. In particular, the phenomenon can be suitably applied to a field of carbide ceramics including the carbon content as its essential component in the sintered compact or of powder metallurgy including the carbon content such as carbon steel.

Further, a silicon carbide sintered compact is another desirable example of a ceramic sintered compact according to the present invention. The silicon carbide sintered compact is inferior to the boron carbide sintered compact in the specific rigidity ratio, but it has an advantage that it is not expensive and workability after sintering is excellent. It is desirable that the silicon carbide sintered compact is produced by means of atmospheric pressure sintering, and that its porosity is 5 volume % or less, preferably 2.5 volume % or less. By performing HIP treatment after atmospheric pressure sintering, it is possible to lower the porosity further to improve the rigidity. The desirable porosity after the HIP treatment is 2.5-volume % or less, preferably 1.5-volume % or less. If the porosity exceeds the desirable upper limit, problems whereby the physical properties are unsatisfactory or chipping is easily produced during processing after sintering may occur. Since there is no desirable lower limit to the porosity, the porosity should be decreased to the range wherein desired physical properties are obtained.

In atmospheric pressure sintering of the silicon carbide, it is desirable that the sintering atmosphere is a non-oxidizing atmosphere such as argon, nitrogen or vacuum and the maximum temperature is 1800~2400° C. A sintering aid is necessary to sinter the silicon carbide in this sintering condition. As the main component of the sintering aid, a compound selected from a group consisting of a compound including a carbon atom, a compound including a boron atom and a compound including an aluminum atom is desirable. For example, an organic high polymer such as phenol resin or furan resin described above or the combination of the organic high polymer with boron carbide, aluminum, alumina, aluminum nitride, pitch, tar, carbon black or the like can be used.

An application field of the sintered powder compact according to the present invention and a field whereby a new structure according to the present invention can be realized include a movable body device with a positioning function. The movable body device with a positioning function of which part or all of the movable section is made of the above sintered powder compact can attain precise and rapid positioning. Preferable specific rigidity ratio of the materials forming a part or all of the movable section used in the present invention is 100 GPa or more, more preferably 110 GPa or more. The specific rigidity ratio is a value obtained by dividing the Young's modulus by the bulk specific gravity. Since the unit of bulk specific gravity is an absolute number, it is possible to express the unit of specific rigidity ratio by GPa in the same manner as Young's modulus. In the present invention, if material with the specific rigidity ratio less than the preferable lower limit is used, the positioning speed and accuracy may be insufficient. It is obvious that there is no desirable upper limit for the specific rigidity ratio, and that the greater the specific rigidity ratio, the more desirable it is, but the attainable specific rigidity ratio is about 200 GPa when the ceramic material is used.

A hydrostatic fluid bearing device is a suitable application field in which the movable body device according to the present invention is utilized. The hydrostatic fluid bearing device is suitably used in a field such as a three-coordinate measuring machine or a straightness-measuring device where highly precise positioning is required. An application field in which high-speed movement is strongly required in addition to highly precise positioning includes a lithography machine that is used for pattern formation on a tabular object such as a semiconductor wafer or a liquid crystal panel. In the lithography machine, there are many mechanism elements forming a movable body on which workpieces to be exposed such as the semiconductor wafer, the liquid crystal panel or a reticle are put. Accordingly, it may not be suitable to define them as movable parts of the hydrostatic fluid bearing device, but it is possible to apply the techniques of the present invention to the parts as far as they form the movable section of the lithography machine.

Further, as a method of reducing the weight of the movable section according to the present invention, a means for making the movable section a hollow structure and/or a rib structure may be adopted. To adopt such a complicated structure, when a highly rigid material, in particular, a ceramic sintered compact is used, it is necessary to reduce man-hours in the grinding process after sintering and also to incorporate a near net shape structure into a compacting process as much as possible.

The most desirable means for producing a hollow structure and/or rib structure in the ceramic sintered compact is making such a structure by arranging molds of slip casting. Slip casting has two types: one is solid (double) casting in which molds are placed on both sides of the compact to let them absorb a solvent, and the other is drain (single) casting in which a mold is placed on one side of the compact to let the excess slurry be discharged from the other side of the compact. To make the hollow structure, it is suitable to provide the mold arrangement whereby the slurry in the hollow section can be discharged. To make the rib structure, it is suitable to provide the mold arrangement whereby the solvent is absorbed by the molds that are placed on both sides of the rib section in the solid casting.

Other than the above, as a means for making the hollow structure and/or rib structure, joining of compacts or joining of sintered compacts may be adopted. As a jointing material in this case, when the compacts are joined, it is desirable to use the same ceramic powder as that forming the compact as a main component with additives such as a solvent or a thickener. When the sintered compacts are joined, it is desirable to use solder such as various alloys and silicon. As another means for making the hollow structure and/or rib structure, carving out of the pre-sintered compact may be adopted. It is, of course, impossible to carve a completely closed hollow structure out of the pre-sintered compact, but it is possible to form the hollow structure by combining with the joining method described above.

According to the present invention, it is possible to provide a mobile body device with a positioning function characterized in that a part or all of a movable section is made of material with a specific rigidity ratio of 100 GPa or more and that a part or all of that section has a hollow structure and/or rib structure. By improving the rigidity of the movable section from both aspects of physical properties of materials and structure of the movable section, accurate and rapid positioning can be realized.

Further, in such a mobile body device with a positioning function as constructed above, a re-crystallized silicon carbide sintered compact infiltrated by a metal such as silicon or a silicon-infiltrated silicon carbide sintered compact produced by reaction sintering can be used for a member having the hollow structure and/or rib structure. The re-crystallized silicon carbide sintered compact infiltrated by the metal or the silicon-infiltrated silicon carbide sintered compact produced by the reaction sintering adopts preferably slip casting in its compacting process to attain the hollow structure and/or rib structure by arranging molds.

A protective member for absorbing shock from a collision with a missile (a flying object) is another application field of the sintered powder compact according to the present invention wherein a new structure according to the present invention is realized. Since the protective member using the above-mentioned sintered powder compact as its component can efficiently absorb shock from the missile, it is possible to improve safety of the device provided with this protective member.

It is also desirable to use a material with a high specific rigidity ratio even in this field in the same manner as in the mobile body device with a positioning function above. It has not yet been completely theoretically solved as to how the specific rigidity ratio of the protective member affects the absorption of shock from the collision with the missile, but it can be outlined as follows. For example, a case where a high-speed missile collides with a structural material provided with a backup layer of fiber reinforced plastics on the back surface of highly rigid ceramics is described here. When the missile collides with the surface of the ceramic material, a compressional wave which is a kind of elastic wave from the shock proceeds toward the backup layer at a speed proportional to the square root of the specific rigidity ratio in the ceramic material and is propagated to a cone making the point of collision the apex thereof. The larger the speed, the wider area where the compressional wave reaches the backup layer and absorbs the shock, and as a result, the shock resistance improves. On the other hand, energy stored in the missile is not only absorbed by the protective member, but also consumed as the compressional wave causing the breakage of the missile itself. The larger the difference between the speed of the compressional wave propagated in the ceramic material and that in the missile, the larger the energy distributed to the compressional wave causing the breakage of the missile. In this case, the specific rigidity ratio of the ceramic material is larger than that of the missile. As a result, the larger specific rigidity ratio of the ceramics used as the component of the protective member is, the more its shock resistance improves.

In addition to the improvement of the specific rigidity ratio for improving the shock resistance, which is an essential function of the above-mentioned protective member, lightening of the weight is important when the sintered powder compact is used, for example, in the protective member of the mobile body and, in particular, in the protective member for use in aerospace. It is also natural that strength enough to prevent the breaking is required in the protective member. From the reasons above, the sintered powder compact according to the present invention can be suitably used as a component of the protective member which absorbs shock from the collision with the missile.

Further, a desirable protective member for absorbing the shock from collision with the missile may adopt a structure in which the backup material is applied on the ceramic sintered compact. Preferable backup material includes, for example, fiber-reinforced plastics. The fiber-reinforced plastics in this case include epoxy resin or polyester resin reinforced by glass fiber, carbon fiber, silicon carbide fiber, aramid fiber or the like.

Still further, as a desirable protective member for absorbing the shock from collision with the missile, a structure whereby the ceramic sintered compact is sandwiched between other materials may be adopted. The materials for sandwiching the ceramic sintered compact include metallic materials such as aluminum, various steel products, or various super alloys. In such a protective member of the sandwich structure, the ceramic sintered compact to be sandwiched with the rib structure or the hollow structure may be suitable viewed from both lightening of the protective member and improvement of the shock absorbing function from collision with missile. In this case, plastics or fiber-reinforced plastics put in the space created by adopting the rib structure or the hollow structure may further improve the shock absorbing function. Sandwiching the ceramic sintered compact with other materials include a structure for housing the ceramic sintered compact or a complex of the ceramic sintered compact with the plastics or the fiber reinforced plastics in a casing of other material.

If the protective member according to the present invention is applied to a device of a structure such that the protective member is arranged obliquely to the predicted direction of collision with the missile, it can further increase the effect. This is the application of the principle whereby when the protective member is inclined at an angle of θ to the direction of collision with the missile, the apparent thickness thereof is multiplied by 1/cosθ. When it is known that the missile will come from a specific direction, it is possible to design a tabular protective member with a large angle to that direction. However, when the in-coming direction cannot be specified without reservation, a protective member with a curved structure may be advantageous. In such a case, the ceramic sintered compact which is a component of the protective member may also be required to have a complicated curved shape to conform to the structure of the protective member. In this case, a technique of the present invention can be suitably applied to such a ceramic sintered compact. Further, a complicated shaped protective member that could not be produced using conventional plate-shaped ceramics can be produced with the ceramic sintered compact according to the present invention. Still further, a structure that could be attained only by combining a plurality of protective members can be integrally produced as a unitary member. To produce such a complicated shaped protective member using ceramics, it is suitable to adopt slip casting in the compacting process.

There is no specific limit to the object to which the protective member according to the present invention can be applied. Thus, the protective member can be widely applied to various structures, buildings, mobile devices such as spaceships, airplanes, helicopters, passenger seats of the helicopters, various vehicles, combat vehicles, marine vessels, and personal protective equipment in which there is some risk of being hit by a missile.

Various ceramic sintered compacts were produced according to the following methods.

1st Embodiment

A predetermined amount of novolac type phenol resin (specific gravity 1.18; manufactured by Showa Highpolymer Co., Ltd.) was added to boron carbide powder (average particle size: 0.47 μm, specific gravity: 2.5, manufactured by Electro Schmelzwerk Kempten GmbH) as an acetone solution, and the mixture was agitated. After sufficiently vaporizing the acetone at room temperature, the mixture was shredded, and boron carbide powder coated with phenol resin was obtained. 25 parts by volume of the boron carbide powder and 75 parts by volume of water were mixed and agitated to form a slurry. Polycarboxylic acid ammonium (manufactured by Kao Corp.) was added to the slurry as a dispersing agent by 1 weight part to 100 weight parts of boron carbide powder. In agitation, a high-speed shear stress of 10000 rpm was applied for the purpose of dispersing flocculated particles as uniformly as possible. Then, vacuum agitation was performed at 300 rpm for defoaming. Boron carbide powder slurry for slip casting obtained in this manner was poured into a plaster mold of 35 mm diameter for drain casting. After attaining a deposition of 5 mm, sludge was discharged and the wet compact was left for 5 minutes. Then, after demolding and drying the wet compact, a dried compact was obtained. A relative density of the compact was calculated from a change of weight from demolding to after drying. A test specimen was cut from the compact after drying and the relative density of the dried compact was measured according to the principle of Archimedes. Further, the test specimen was sintered according to a heat curve I of Table 9. Relative density of the sintered compact obtained in this manner was measured by the principle of Archimedes. These results are shown in Table 1. It is to be noted that the amount of addition of phenol resin is shown by volume parts relative to the boron carbide powder.

2nd Embodiment

A mixed solution of an acetone solution of novolac type phenol resin (specific gravity: 1.18; manufactured by Showa Highpolymer Co., Ltd.) and a hexane solution of polycarbosilane was added to boron carbide powder (average particle size: 0.74 μm, specific gravity: 2.5, manufactured by Electro Schmelzwerk Kempten GmbH), then the mixture was agitated. After sufficiently vaporizing an organic solvent, the mixture was shredded to provide boron carbide powder as a starting material. Compacting and sintering were performed using this powder in the same method and condition as in the first embodiment. The amounts of phenol resin and polycarbosilane added are shown by volume parts relative to the boron carbide powder.

3rd Embodiment

Each powder of TiC, ZrC, $Fe_3C$, $TiB_2$ and $AlF_3$ in predetermined amounts was mixed, as a sintering aid for boron carbide, with about 200 g of boron carbide powder (average particle size: 0.74 μm, specific gravity: 2.5, manufactured by Electro Schmelzwerk Kempten GmbH). About 1000 g water was added to the mixed powder and mixed for 24 hours using a pot mill to allow the boron carbide powder and the sintering aid powder to be uniformly dispersed in the water. Then, the mixture was dried and shredded to provide a starting material of boron carbide mixed powder. Compacting and sintering were performed using this powder in the same method and condition as in the first embodiment. The amounts of each sintering aid powder added are shown by volume parts relative to the boron carbide powder.

4th Embodiment

The mixed powder of boron carbide and each various sintering aid prepared in the third embodiment was coated with phenol resin using the same method as in the first embodiment. Using the mixed powder of boron carbide powder, sintering aid powder and phenol resin, compacting and sintering were performed in the same method and conditions as in the first embodiment.

1ST COMPARATIVE EXAMPLE 30 parts by volume of boron carbide powder and 70 parts by volume of water were mixed, and the mixture was compacted and sintered in the same method and conditions as in the first embodiment. Then the relative density of sintered compact obtained was measured. Polycarboxylic acid ammonium was added to the mixture, as a dispersing agent, by 1 weight part to 100 weight parts of boron carbide powder.

2ND COMPARATIVE EXAMPLE

A resorcinol type phenol resin water solution (manufactured by Showa Highpolymer Co., Ltd.) was added to the mixture used in the first comparative example by 5–50 volume parts to 100 volume parts of boron carbide powder to prepare a slurry, wherein slip casting was performed in a plaster mold. As a result, nearly no phenomenon of deposition occurred and a compact could not be obtained.

Measured results of each physical property in the first to fourth embodiments and a first comparative example are shown in Table 1. A true specific gravity used for calculating the relative density of the sintered compact when the sintering aid powder of the third and fourth embodiments was used, was a value computed from each specific gravity of the boron carbide powder and the sintering aid powder according to their mixed ratio. Blank columns in the Table show that no measurement was made. As for the second comparative example, results are not shown because the compact could not be obtained. The compacts according to the first, second and fourth embodiments showed high plasticity when demolded and produced no cracks even if they were bent or twisted when demolded. On the other hand, the compacts according to the third embodiment and the first comparative example created cracks even when they were bent or twisted a little when demolded. After drying, the compacts according to the first, second and fourth embodiments show high strength and were not damaged even when dropped from a height of about 100 mm. On the other hand, the compacts of the third embodiment and the first comparative example were seriously damaged when dropped from a height of about 50 mm.

TABLE 1

| Item | Aid component | Sintering aid amount of addition (Vol %) | Wet compact relative density (%) | Dried compact relative density (%) | Sintered compact relative density (%) |
|---|---|---|---|---|---|
| 1st Embodiment | Phenol resin | 6.3 | 49.2 | 57.6 | 90.0 |
| | | 12.6 | 49.7 | 55.7 | 90.5 |
| | | 18.9 | 50.4 | 56.1 | 93.0 |
| | | 31.5 | 54.5 | 59.9 | 92.3 |

TABLE 1-continued

| Item | Aid component | Sintering aid amount of addition (Vol %) | Wet compact relative density (%) | Dried compact relative density (%) | Sintered compact relative density (%) |
|---|---|---|---|---|---|
| 2nd Embodiment | Phenol resin + Polycarbosilane | 18.9 + 4.5 | — | — | 94.5 |
| 3rd Embodiment | TiC | 2.5 | — | — | 95.0 |
| | ZrC | 1.9 | — | — | 93.0 |
| | $Fe_3C$ | 1.6 | — | — | 91.1 |
| | $TiB_2$ | 2.8 | — | — | 94.0 |
| | $AlF_3$ | 4.3 | — | — | 91.5 |
| | | 8.8 | — | — | 97.9 |
| 4th Embodiment | TiC + Phenol resin | 2.5 + 11.3 | — | — | 95.1 |
| | ZrC + Phenol resin | 1.9 + 11.3 | — | — | 90.1 |
| | $Fe_3C$ + Phenol resin | 1.6 + 12.6 | — | — | 90.2 |
| | $TiB_2$ + Phenol resin | 2.8 + 12.6 | — | — | 90.7 |
| | $AlF_3$ + Phenol resin | 4.3 + 11.3 | — | — | 94.0 |
| 1st Comparative Example | Nil | — | 49.4 | 53.5 | 69.0 |

5th Embodiment

Using a slurry which had the same composition as a volume part of the phenol resin additive ratio (18.9%) in the first embodiment, a compact was made by means of a solid casting by a plaster slip casting and a drain casting by pressure slip casting of 1.8 MPa. In the plaster slip casting, hardening time was set as a half of estimated thickening time, while in the pressure slip casting, 3 minutes' hardening was performed at a pressure of 0.3 MPa after sludge was discharged. The compact had a diameter of 80 mm and a thickness of 10 mm. The compact obtained in this manner was dried and then the relative density of the dried compact was measured by Archimedes' principle. Dry strength of the compact made by pressure slip casting was measured by a three-point bending strength test method according to JISR1601. Next, three-point bending strength according to a method of JISR1601, Young's modulus according to a resonance method and Young's modulus according to three-point bending by a method of JISR1602, and relative density and bulk specific gravity of the sintered compact according to Archimedes's principle were measured on samples sintered according to sintering patterns I and II of Table 9.

3RD COMPARATIVE EXAMPLE

Using the slurry of the same composition as in the First Comparative Example, a compact was prepared using the same method as a means of pressure slip casting in the fifth embodiment. The compact obtained in this manner was dried and the dried compact strength was measured.

Results of the fifth embodiment and the third comparative example are shown in Table 2 and Table 3, respectively.

TABLE 2

| | Dried compact relative density (%) | Sintering pattern | Bulk specific gravity | Sintered compact relative density (%) | Young's modulus (GPa) Resonance method | Young's modulus (GPa) Three-point bending | Specific rigidity ratio (GPa) | Bending strength (N/mm$^2$) |
|---|---|---|---|---|---|---|---|---|
| Plaster slip casting | 56.8 | I | 2.47 | 98.9 | 375 | 373 | 151 | 490 |
| | | II | 2.47 | 98.9 | 354 | 351 | 142 | 535 |
| Pressure slip casting | 57.1 | I | 2.37 | 94.7 | 345 | 332 | 140 | 476 |
| | | II | 2.31 | 92.6 | 337 | 329 | 146 | 431 |

TABLE 3

| | Dried body bending strength (N/mm$^2$) |
|---|---|
| 5th embodiment | 15.0 |
| 3rd comparative example | 1.4 |

6th Embodiment 2.8 parts by volume of TiB$_2$ and 100 parts by volume of boron carbide were mixed. A mixed powder of a boron carbide powder and a TiB$_2$ powder obtained in the same method as in the third embodiment was prepared as a starting material. A slurry was prepared using the mixed powder coated with a phenol resin by the same additive rate and method as in the fifth embodiment, and a compact was made from the slurry and was sintered in the same manner as in the fifth embodiment. Then, physical properties of the compact were measured in the same manner as in the fifth embodiment. Measured results are shown in Table 4. A true specific gravity value used when a dried compact relative density and a sintered compact relative density were calculated was a value calculated from each specific gravity of the boron carbide powder and the TiB$_2$ powder according to their mixed ratio.

7th Embodiment

A compact was prepared using a slurry with the same composition as in the fifth embodiment and the same means and method employed in the pressure slip casting of the fifth embodiment. Two kinds of compacts of 80 mm diameter and deposition thickness of 10 mm and 30 mm were prepared and dried. Their dried compact relative density was measured according to the principle of Archimedes. After measurement, the two compacts with thickness of 10 mm and 30 mm were sintered according to sintering patterns III, IV of Table 9. Three-point bending strength according to a technique of JISR1601, Young's modulus by three-point bending according to a technique of JISR1602, sintered compact relative density and bulk specific gravity according to Archimedes' principle were measured on sintered compacts obtained in the manner stated above. Each sintered compact was divided into two: the upper (slurry surface side) portion and the lower (water absorbing surface side) portion and three-point bending strength, Young's modulus, sintered compact relative density and bulk specific gravity were measured on each portion. Measured results are shown in Table 5.

TABLE 4

| | Dried compact relative density (%) | Sintering pattern | Bulk specific gravity | Sintered compact relative density (%) | Young's modulus (GPa) Resonance method | Young's modulus (GPa) Three-point bending | Specific rigidity ratio (GPa) | Bending strength (N/mm$^2$) |
|---|---|---|---|---|---|---|---|---|
| Plaster slip casting | 55.1 | I | 2.37 | 91.0 | 336 | 341 | 144 | 509 |
| | | II | 2.43 | 93.4 | 354 | 348 | 143 | 441 |
| Pressure slip casting | 55.6 | I | 2.34 | 90.3 | 361 | 341 | 146 | 487 |
| | | II | 2.37 | 91.3 | 380 | 360 | 152 | 598 |

TABLE 5

| | Deposition thickness (mm) | Dried compact relative density (%) | Sintering pattern | Sample position | Bulk specific gravity | Sintered compact relative density (%) | Young's modulus (GPa) | Specific rigidity ratio (GPa) | Bending strength (N/mm$^2$) |
|---|---|---|---|---|---|---|---|---|---|
| Pressure slip casting | 10 | 56.8 | III | Upper | 2.34 | 93.7 | 354 | 151 | 497 |
| | | | | Lower | 2.35 | 94.0 | 349 | 149 | 380 |
| | 30 | 57.1 | | Upper | 2.35 | 93.9 | 357 | 152 | 557 |
| | | | | Lower | 2.34 | 93.7 | 354 | 151 | 514 |
| | 10 | 56.8 | IV | Upper | 2.41 | 96.4 | 379 | 157 | 530 |
| | | | | Lower | 2.42 | 97.0 | 398 | 164 | 572 |
| | 30 | 57.1 | | Upper | 2.43 | 97.0 | 386 | 159 | 496 |
| | | | | Lower | 2.42 | 96.8 | 377 | 156 | 504 |

4TH COMPARATIVE EXAMPLE

Using a slurry with the same composition as 18.9 volume parts of the resorcinol type phenol resin addition in the second comparative example, a compact of deposition thickness of 10 mm was prepared using the same method as in the fifth embodiment and was sintered according to the sintering pattern IV of Table 9. Three-point bending strength according to a technique of JISR1601, Young's modulus by three-point bending according to a technique of JISR1602, and sintered compact relative density and bulk specific gravity according to Archimedes' principle were measured on the sintered compact obtained in the manner described above. Measured results are shown in Table

TABLE 6

| | Sintering pattern | Bulk specific gravity | Sintered compact relative density (%) | Young's modulus (GPa) | Specific rigidity ratio (GPa) | Bending strength (N/mm$^2$) |
|---|---|---|---|---|---|---|
| Pressure slip casting | IV | 2.17 | 86.6 | 230 | 106 | 81 |

8th Embodiment

Figure 2:
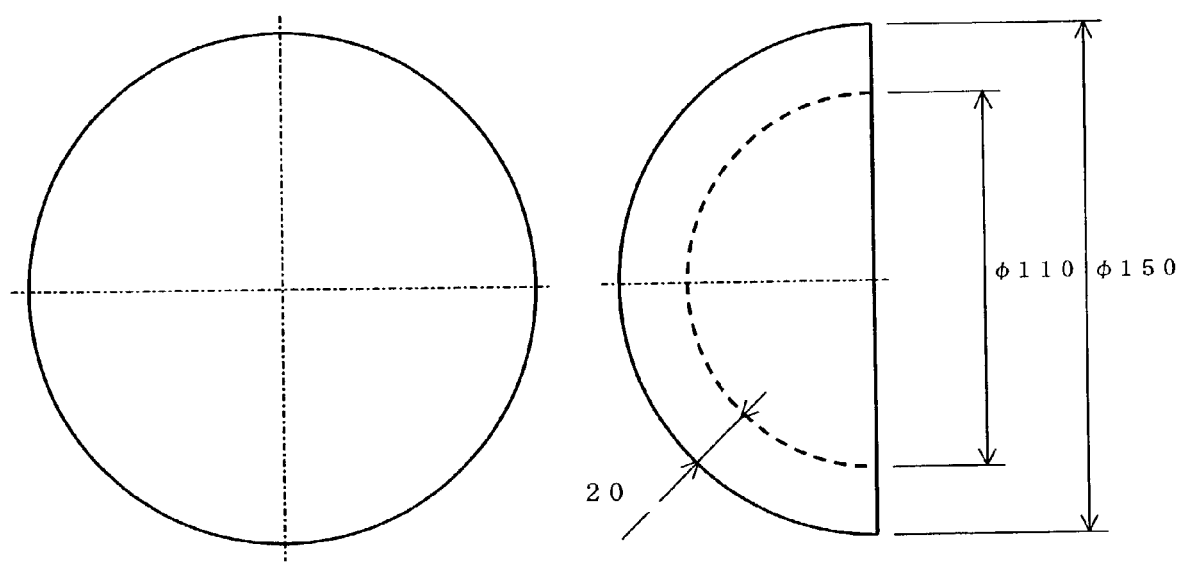
FIG. 2 is an explanatory view of a curve-structured, solid casting compact.
Figure 3:
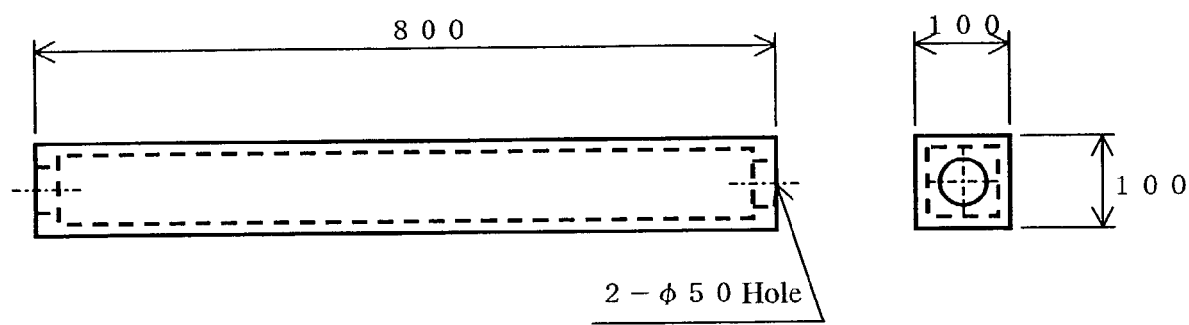
FIG. 3 is an explanatory view of a hollow-structured, drain casting compact.

Using a slurry with the same composition as in the fifth embodiment and according to pressure slip casting of 1.5 MPa, large compacts were prepared by means of a solid casting and drain casting. Shapes of the compacts were a rib structure as shown in FIG. 1 and a curved structure as shown in FIG. 2 in the case of the solid casting, and a hollow structure as shown in FIG. 3 in the case of drain casting. In the case of solid casting, 130% of the estimated deposition time was provided as pressing time, while in the case of drain casting, after deposition was attained, the slurry was discharged and the deposited slurry was hardened for five minutes at a pressure of 0.4 MPa. When the compact was demolded, a back pressure of 0.2 MPa was applied to the mold. As a result, the compact could be demolded by water screen between the compact and the mold without any deformation or damage.

After the compact obtained in this manner was gradually dried for three days, the compact was sintered according to the sintering pattern IV of Table 9. As a result of sintering, no deformation or cracking occurred. A specimen was cut away from a rib structure section obtained by solid casting among the sintered compacts obtained as described above. Three-point bending strength according to a technique of JISR1601, Young's modulus by three-point bending according to a technique of JISR1602, and sintered compact relative density and bulk specific gravity according to Archimedes' principle were measured on the specimen. Measured results are shown in Table 7.

TABLE 7

| | Sintering pattern | Bulk specific gravity | Sintered compact relative density (%) | Young's modulus (GPa) | Specific rigidity ratio (GPa) | Bending strength (N/mm$^2$) |
|---|---|---|---|---|---|---|
| 8th embodiment | IV | 2.48 | 99.9 | 405 | 163 | 631 |

9th Embodiment

Young's modulus and bulk specific gravity of each sample of a boron carbide sintered compact (Specimen No. 1), silicon carbide sintered compact (Specimen No. 2), silicon-infiltrated re-crystallized silicon carbide sintered compact (Specimen No. 3), silicon-infiltrated silicon carbide sintered compact made by reaction sintering (Specimen No. 4), and alumina sintered compact (Comparative specimen) as ceramic sintered compacts were measured. The measuring method for the Young's modulus was based on the resonance method.

Each specimen was now used as a slider that completely surrounds a guide shaft of a hydrostatic fluid bearing. Compressed air was supplied between the slider and the guide shaft to support the slider in non-contact state with the guide shaft. Then, the slider was repeatedly reciprocated every 1 mm at a stroke of 200 mm using a driving means for evaluation of the positioning function. Evaluation results are shown in Table 8. The evaluation of the positioning function was made taking positioning resolution and time required for positioning into consideration, wherein a mark ⊚ shows "Especially good" and a mark ○ shows "good" and × shows "poor", respectively.

TABLE 8

| Specimen No. | Young's modulus (GPa) | Bulk specific gravity | Specific rigidity ratio (GPa) | Evaluation of positioning function |
|---|---|---|---|---|
| 1 | 402 | 2.48 | 162 | ⊚ |
| 2 | 391 | 3.18 | 123 | ○ |

TABLE 8-continued

| Specimen No. | Young's modulus (GPa) | Bulk specific gravity | Specific rigidity ratio (GPa) | Evaluation of positioning function |
|---|---|---|---|---|
| 3 | 330 | 3.01 | 110 | ○ |
| 4 | 325 | 3.00 | 108 | ○ |
| Comparison | 352 | 3.90 | 90 | X |

TABLE 9

| Sintering pattern | I | | II | | III | | IV | |
|---|---|---|---|---|---|---|---|---|
| Maximum temperature (° C.) | 2250 | | 2250 | | 2300 | | 2300 | |
| Holding time at the maximum temperature (min.) | 30 | | 30 | | 30 | | 240 | |
| Rate of temperature rise | Fast | | Slow | | Slow | | Slow | |
| Temperature pattern | Time (min.) | Atmosphere | Time (min.) | Atmosphere | Time (min.) | Atmosphere | Time (min.) | Atmosphere |
| 20 → 1200° C. | 60 | Vacuum | 180 | Vacuum | 180 | Vacuum | 180 | Vacuum |
| 1200 → 2000° C. | 70 | Ar | 130 | Ar | 130 | Ar | 130 | Ar |
| 2000 → Maximum temperature | 30 | Ar | 30 | Ar | 30 | Ar | 30 | Ar |
| Maximum temperature holding | 30 | Ar | 30 | Ar | 30 | Ar | 240 | Ar |
| Maximum temperature → 1200° C. | Heating OFF | Ar | 150 | Ar | 150 | Ar | 150 | Ar |
| 1200 → 200° C. | — | — | 160 | Ar | 160 | Ar | 160 | Ar |
| | — | — | Heating OFF | Ar | Heating OFF | Ar | Heating OFF | Ar |

As described above, in a wet-type compacting method for powder using a solvent according to the present invention, it is possible to apply excellent plasticity and/or strength to a compact, maintaining homogeneity of the compact and generating no problems during a compacting process. If a sintering process follows a compacting process, it is possible to improve the sintering characteristics. It is also possible to attain high-speed and highly accurate positioning of a mobile body device having a positioning function such as a lithography machine. Further, it is possible to obtain a high-functioning, light and inexpensive protective member that absorbs shock from collision with a missile.

Although there have been described in detail what are the preferred embodiments of the present invention, it will be understood by persons skilled in the art that variations and modifications may be made thereto without departing from the gist, sprit or essence of the invention. The scope of the invention is indicated by the appended claims.

What is claimed is:

1. A production method for a boron carbide sintered compact comprising the steps of:
   coating boron carbide powder with a polymer organic substance that is substantially insoluble in water;
   mixing the coated boron carbide powder and water to form a slurry;
   producing a compact from the slurry; and
   sintering the produced compact,
   wherein the polymer organic substance exhibits a function as a sintering aid of the powder when sintered so as to control the grain growth of boron carbide, and a part of the sintering aid is taken into boron carbide crystals, and
   wherein the porosity of the sintered compact is 10 volume % or less.

2. A production method for a boron carbide sintered compact according to claim 1, wherein a volume fraction of the powder and the polymer organic substance in the mixture is 1–40 parts by volume of the polymer organic substance to 100 parts by volume of the boron carbide powder.

3. A production method for a boron carbide sintered compact according to claim 1, wherein the slurry is poured into a porous mold to let the mold absorb a part of the water, thereby producing the compact.

4. A method according to claim 1, wherein the produced compact is dried, and then the dried compact is sintered.

5. A method according to claim 1, wherein all or a part of said sintering step is performed in a non-oxidizing atmosphere, such that the polymer organic substance is reformed to a substance which contains carbon from the polymer organic substance as its main component, and the substance containing the carbon as its main component exhibits a function us a sintering aid of the powder.

6. A production method for a boron carbide sintered compact according to claim 1, wherein the polymer organic substance functions as a compacting aid for providing at least one of plasticity and strength to a compact or its precursor in the compacting step.

7. A production method for a boron carbide sintered compact according to claim 1 wherein the average particle size of boron carbide powder is 0.3 μm ~1.4 μm.

8. The method according to claim 4, wherein the sintering step is performed under atmospheric pressure and a non-oxidizing atmosphere.

9. The method according to claim 8, comprising a further step of performing HIP treatment on the sintered compact.

10. A production method for a boron carbide sintered compact comprising the steps of:
   coating boron carbide powder with a polymer organic substance that is substantially insoluble in water;
   mixing the coated boron carbide powder and water to form a slurry;
   producing a compact from the slurry, and
   sintering the produced compact,
   wherein the polymer organic substance exhibits a function as a sintering aid of the powder when sintered so as to control the grain growth of boron carbide, and a part of the sintering aid is taken into boron carbide crystals,
   wherein the porosity of the sintered compact is 10 volume % or less, and
   wherein the polymer organic substance is selected from the group consisting essentially of epoxy resin, polyurethane resin, diallyl phthalate resin, polyethylene resin, polycarbonate resin, fluorocarbon resin, polypropylene resin, urea resin, melamine resin, polyester resin, styrol resin, acrylic resin, polyacetal resin, polyvinyl acetate resin, phenol resin, furan resin, polyamide resin, vinyl chloride resin, cellulose resin, and saccharides.

* * * * *

UNITED STATES PATENT AND TRADEMARK OFFICE
CERTIFICATE OF CORRECTION

PATENT NO. : 7,288,222 B2
APPLICATION NO. : 10/069702
DATED : October 30, 2007
INVENTOR(S) : Matsumoto et al.

It is certified that error appears in the above-identified patent and that said Letters Patent is hereby corrected as shown below:

Column 1:
　Line 24, change "usually adopted whereby" to --usually adopted, whereby--.
　Line 26, change "a compact or the precursor thereof is formed" to --a compact, or the precursor thereof, is formed--.
　Line 27, change "compact or the precursor thereof made from" to --compact, or the precursor thereof, made from--.
　Line 53, change "No. HEI 10-1366 or" to --No. HEI 10-1366, or--.
　Line 62, change "compact, therefore it is" to --compact; therefore, it is--.

Column 3:
　Line 14, change "Alumina" to --alumina--.
　Line 42, change "and there has been" to --and there have been--.
　Line 52, change "background of appearance" to --background of the appearance--.
　Line 53, change "in that the main" to --that the main--.
　Line 54, change "missile such as AP" to --missile, such as AP--.
　Line 56, change "fire to a missile" to --fire, to a missile--.

Column 5:
　Line 6, change "lar, a ceramic" to --lar a ceramic--; change "compact is applied" to --compact, is applied--.
　Line 12, change "In this case, a plate or tile" to --In this case, plate- or tile- --.
　Line 38, change "It is therefore an object" to --It is, therefore, an object--.

Column 6:
　Line 12, change "compacting aid and" to --compacting aid, and--.
　Line 13, change "mold, letting" to --mold; letting--.
　Line 15, change "a compact, and after" to --a compact; and, after--.
　Line 16, change "atmosphere or HIP-" to --atmosphere, or HIP- --.

Column 7:
　Line 17, change "However as described" to --However, as described--.
　Line 62, change "most novolac type" to --most novolac-type--.
　Line 63, change "resorcinol type" to --resorcinol-type--.

Column 8:
　Line 62, change "1methylcellulose, carboxylmethylcellulose" to --methylcellulose, carboxymethylcellulose--.
　Line 63, change "boxylmethycellulose" to --boxymethylcellulose--.
　Line 64, change "hydroxylethylcellulose" to --hydroxyethylcellulose--.
　Line 65, change "hydroxylethylcellulose" to --hydroxyethylcellulose--.

UNITED STATES PATENT AND TRADEMARK OFFICE
CERTIFICATE OF CORRECTION

PATENT NO. : 7,288,222 B2
APPLICATION NO. : 10/069702
DATED : October 30, 2007
INVENTOR(S) : Matsumoto et al.

It is certified that error appears in the above-identified patent and that said Letters Patent is hereby corrected as shown below:

Column 8 (continued):
  Line 67, change "monoethy-" to --monoethyl- --.

Column 9:
  Line 1, change "lamine" to --amine--.
  Line 60, change "and for example," to --and, for example--.

Column 11:
  Line 17, change "(Hot Isos-" to --(Hot Iso- --.
  Line 18, change "tatic Pressing)" to --static Pressing)--.

Column 12:
  Line 22, change "2.5-volume %" to --2.5 volume %--; change "1.5-volume %" to --1.5 volume %--.

Column 13:
  Line 24, change "a near net shape structure" to --a near net-shape structure--.

Column 15:
  Line 24, change "the shock absorbing" to --the shock-absorbing--.

Column 18:
  Line 41, change "3 minutes' hardening" to --hardening--.
  Line 42, change "was performed at" to --was performed for 3 minutes at--.
  Lines 60-61, change "First Comparative Example" to --first comparative example--.

Column 21:
  Line 30, change "results are shown in Table" to --results are shown in Table 6.--.

Column 22:
  Line 57, change "Especially good" to --especially good--.

UNITED STATES PATENT AND TRADEMARK OFFICE
CERTIFICATE OF CORRECTION

PATENT NO. : 7,288,222 B2
APPLICATION NO. : 10/069702
DATED : October 30, 2007
INVENTOR(S) : Matsumoto et al.

It is certified that error appears in the above-identified patent and that said Letters Patent is hereby corrected as shown below:

Column 23:
 Line 59, change "the gist, sprit or essence" to --the gist, spirit, or essence--.

Signed and Sealed this

First Day of July, 2008

JON W. DUDAS
*Director of the United States Patent and Trademark Office*